June 16, 1964  C. O. MOORHEAD  3,137,179
PISTON ROD AND PISTON ASSEMBLY
Filed Dec. 16, 1960  2 Sheets-Sheet 1

Charles O. Moorhead
INVENTOR.

BY Murray Robinson
ATTORNEY

June 16, 1964
C. O. MOORHEAD
3,137,179
PISTON ROD AND PISTON ASSEMBLY
Filed Dec. 16, 1960
2 Sheets-Sheet 2
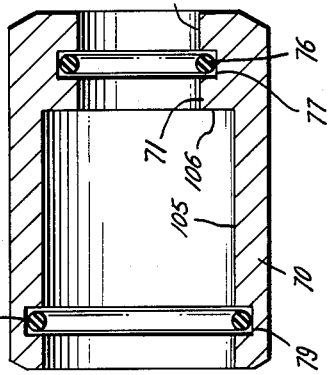
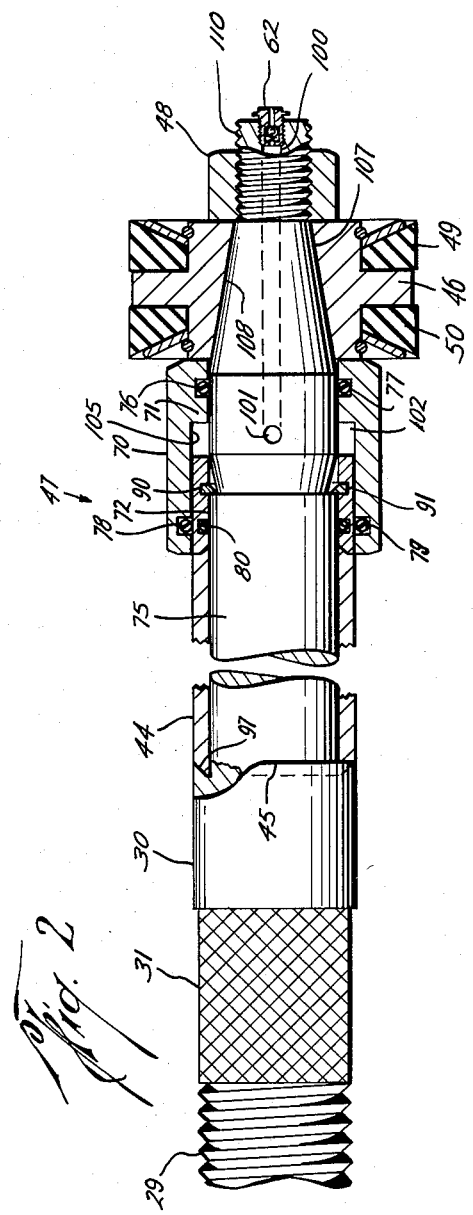
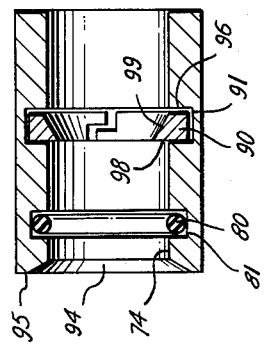
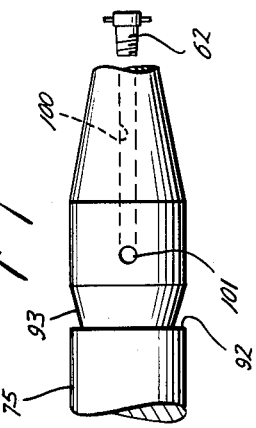
Charles O. Moorhead
INVENTOR.
BY Murray Robinson
ATTORNEY _United States Patent Office_

3,137,179
Patented June 16, 1964

3,137,179
PISTON ROD AND PISTON ASSEMBLY
Charles O. Moorhead, Oklahoma City, Okla., assignor to M-C-M Machine Works, Oklahoma City, Okla., a partnership
Filed Dec. 16, 1960, Ser. No. 76,316
4 Claims. (Cl. 74—579)

This invention pertains to piston rod and piston assemblies.

According to the invention a piston rod is machined down to a reduced diameter over a portion of its length extending from near the head end all the way to the piston end, leaving a shoulder near the head end. A snugly fitting sleeve is pushed over the piston end of the rod up against the shoulder. A hydraulic unit comprising a cylinder closed at one end and a piston axially slidably disposed therein, with an axial hole through the unit snugly fitting the reduced diameter portion of the rod, is then placed over the piston end of the rod with the hydraulic unit piston abutting against the end of the wear sleeve. A piston having a central aperture correlative to the end of the piston rod, preferably tapered but permissibly cylindrical, is then placed over the piston end of the rod abutting against the cylinder of the hydraulic unit. A nut is screwed onto the threaded end of the rod against the piston. Grease is pumped through a check valve in the piston end of the rod through an axial passage in the rod connecting to a radial passage in the rod terminating in the annular space inside the hydraulic unit around the rod and between the piston and the closed end of the cylinder. The grease pressure forces the hydraulic piston against the wear sleeve holding it tight against the piston rod shoulder, and the pressure also forces the hydraulic cylinder tight against the piston holding the piston tight against the nut. To remove the piston and wear sleeve the nut is loosened and pressure applied to the grease sufficient to back the piston off the rod. The hydraulic cylinder is then pumped off the rod with further grease pressure if need be or manually removed. The hydraulic piston is removed. The end of the wear sleeve is then exposed and can be removed with a suitable grapple. New piston rings are installed on the piston body after the piston has been removed. The repaired piston and a new wear sleeve are then reassembled with the piston rod in the manner previously described.

One of the advantages of the invention is that it makes it possible to remove the piston from the piston rod for repair or replacement without the necessity of removing the piston rod from the pump or motor or like apparatus in which it operates. It is useful in connection with standard, i.e. conventional, type pistons without modification of the piston in any way.

The invention also makes it possible to repair the piston rod without removing it from the pump or motor or like apparatus, if the piston rod is initially provided with a wear sleeve according to the invention.

The invention is also useful for repairing piston rods of conventional design, which can be converted to conform to the invention by machining the piston rod. This of course will necessitate removal of the piston rod from the associated apparatus and the addition of an assembly cylinder.

The invention results in a considerable saving by extending the life of the piston rod which need only be repaired occasionally by replacing the wear sleeve.

A further economy is effected by use of the invention in that the life of the rod packing will be prolonged due to the elimination of the use of rods having rough surfaces due to excessive wear and corrosion.

Other advantages and objects of the invention will become apparent from the following detailed description of a preferred embodiment thereof, reference being made to the accompanying drawings, wherein, FIGURE 1 is a semi-schematic vertical axial section through a power pump in which a piston rod and piston incorporating the invention may be employed;

FIGURE 2 is an elevation, partly in section, of a piston rod and piston incorporating the invention.

FIGURE 3 is an elevation showing a portion of the piston end of the rod;

FIGURES 4 and 5 are respectively axial sections to a larger scale of the hydraulic piston and cylinder.

Figure 1:
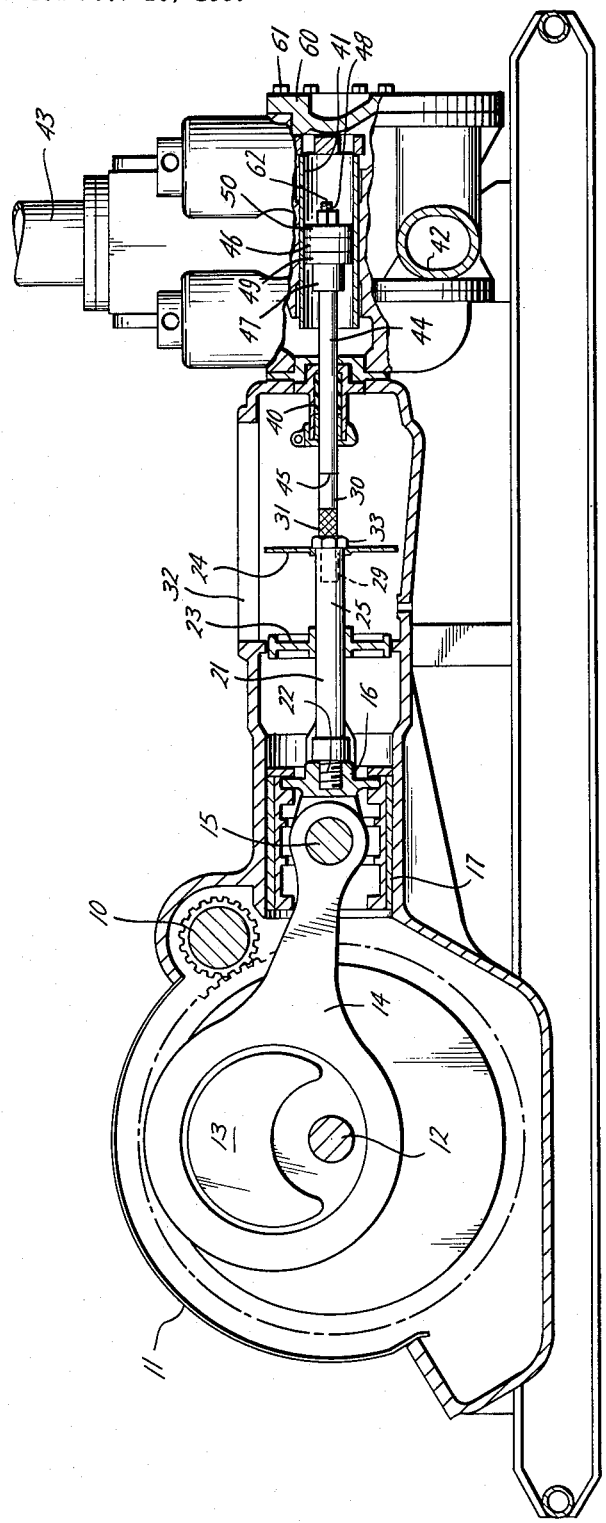

Referring now to FIGURE 1, there is shown a power pump comprising a power input shaft 10, reduction gear housing 11, an output shaft 12, an eccentric 13, a connecting rod 14, wrist pin 15, cross head 16, and guide bearing 17. A cross head extension bar 21 is screwed into the head at one end 22. The extension bar reciprocates through wiper 23 and carries a splash guard 24 at its other end 25.

Piston rod 30 has its threaded end 29 screwed into extension bar 21 by applying a wrench to knurled portion 31, work being carried on through access opening 32 in the pump housing. The rod is secured in place by lock nut 33.

The rod extends through packing gland 40 into the interior of liner 41 in the fluid end of the pump. The pump inlet is at 42 and the outlet is at 43.

There is a wear sleeve 44 on the piston rod. The wear sleeve is at least long enough to cover the entire portion of the length of the piston rod which at any time during the reciprocation of the rod comes into contact with packing gland 40, this being the portion of the rod most subject to wear. The sleeve also preferably extends all the way to the piston end of the rod to protect it from corrosion by fluids being pumped. The sleeve abuts a thrust shoulder 45 on the rod, which shoulder faces away from the head 22 toward the piston end of the rod. A piston 46 is mounted on the piston end of the rod between hydraulic unit 47 and nut 48 screwed onto the end of the rod. The piston includes piston rings 49, 50, removably secured to the body of the piston in any conventional manner, for example by end plates and snap rings as shown at pages 3479 of the 1958–59 Edition of the Composite Catalog of Oil Field and Pipe Line Equipment, volume 2.

When it is desired to remove the piston and/or the wear sleeve, e.g. for replacing the piston rings and/or the wear sleeve, the bonnet 60 on the end of the pump is removed by unfastening screws 61, thereby exposing the piston. Nut 48 is then loosened and a grease pump connected to zerk fitting 62 in the end of the rod. Application of pressure with the grease pump expands hydraulic unit 47 pushing the piston 46 loose from the rod. The nut 48 and piston 46 and the unit 47 are then removed from the rod. The wear sleeve 21 is then removed with a suitable grapple.

A new wear sleeve is then placed over the rod, the hydraulic unit replaced, new piston ring placed on the piston, the piston replaced, the nut screwed on, and pressure applied to the unit through the zerk fitting and the bonnet 62 replaced. The pump is then ready for further operation.

Referring now to FIGURES 2 through 5, it will be seen that the hydraulic unit 47 comprises a hydraulic cylinder 70 having one end 71 closed and a piston 72 inserted through the other end. Axial holes 73 through the closed end of the cylinder and 74 through the piston snugly fit the reduced diameter portion 75 of the piston rod. An O-ring 76 received in annular groove 77 seals the closed end 71 of the cylinder to the rod portion 75. An O-ring 78 received in annular groove 79 seals the open end of the cylinder to the piston 72. An O-ring 80 in annular groove 81 seals the piston to the reduced portion 75 of the piston rod.

In order to limit the travel of the hydraulic piston a resilient split ring 90 is disposed in annular groove 91 in the hydraulic piston 72. This ring 90 cooperates with a stop shoulder 92 formed on the reduced portion 75 of the piston rod. The shoulder is formed by cutting a tapered portion 93 on the piston rod portion 75. The end of the hydraulic piston is bevelled internally at 94 to facilitate slipping the hydraulic unit past shoulder 92 up next to the square end face 94 of the wear sleeve 45 during assembly.

The hydraulic unit could be reversed, within the scope of the invention, placing the hydraulic cylinder adjacent the wear sleeve and the hydraulic piston adjacent the piston 46. In such case the travel limiting means provided by the split ring would be placed in the axial passage through the closed end of the cylinder.

When the parts are unstressed, the distance from stop shoulder 92 to shoulder 45 is slightly less than the combined lengths of wear sleeve 44 and the portion of hydraulic piston 72 from its end face 95 to side 96 of groove 91 in the hydraulic piston less the axial extent of the split ring. This enables grease pressure in the hydraulic unit to force the hydraulic piston against the wear sleeve to hold it in place. The head end 97 of the wear sleeve is bevelled and the shoulder 45 is correlatively tapered so that end thrust on the wear sleeve forces its bevelled end 97 radially inwardly into tight sealing engagement with the piston rod. This also allows a slight axial motion of the sleeve so that ultimately the square end face 98 of the split ring abuts the stop shoulder 92 to prevent any additional pressure being placed on the wear sleeve. Thereafter such additional grease pressure as may be desired, either to further tighten the piston 46 or to force the piston 46 off the rod, is taken by the stop shoulder.

The inner periphery 99 of the split ring is tapered so that the ring can easily ride up on tapered portion 93 of the piston rod when it is desired to remove the hydraulic piston from the rod.

To apply pressure to the hydraulic unit the piston rod is provided with a longitudinal, preferably axial, passage 100 and one or more transverse, preferably radial passages 101, which communicate with the annular space 102 inside the hydraulic unit around the reduced portion 75 of the piston rod and between the piston 72 and the closed end 71 of the cylinder 70. A zerk or similar fitting 62 is screwed into the end of passage 100. The fitting combines a spring biased check valve preventing back flow of grease from the hydraulic unit through passages 101 and 100 and a connection to which the pipe or hose from the grease pump (not shown) can be connected.

It is important that there be enough force provided by the hydraulic unit 47 to free the piston 46 from the piston rod after the nut 48 has been loosened. By using a high pressure grease pump, this force can theoretically be made as large as desired. To reduce the required pump pressure, the effective area of the hydraulic unit can be increased by making the hydraulic piston larger than the wear sleeve as to outer diameter, and correspondingly increasing the bore 105 of the hydraulic cylinder. This will increase the area of the portion 106 of the closed end 71 of the hydraulic cylinder exposed to the hydraulic pressure. By increasing the taper of the tapered portion 107 of the piston rod and correlative axial opening 108 of the piston, preferably until the taper is only slightly seizing or non-seizing, or by using a cylindrical untapered portion to support the piston 46, the required force to remove the piston can be reduced. For example, the portion 107 may have a taper of 3½ inches per foot measured on the diameter.

It will be apparent that the invention not only provides a new mode of assembly and disassembly of a piston and piston rod but also provides a novel piston rod incorporating a replaceable wear sleeve. The sleeve should be both wear and corrosion resistant and to this end may be chrome plated and smooth finished, it being understood that the sleeve and rod are made of high quality, preferably machinery grade, steel. In this connection the hydraulic unit may be considered to be part of a piston rod assembly, forming a means for retaining the wear sleeve portion thereof in position, as well as providing means for tightening the piston on the rod or pressing it off the rod.

It will also be apparent that the hydraulic unit could be used without providing a removable wear sleeve on the piston rod. In such case the piston rod would not be turned down over the length of the wear sleeve but only over the portion thereof at the piston end occupied by the hydraulic unit, the shoulder 95 being formed adjacent the end face 95 of the hydraulic piston and being formed as a square shoulder to abut against end face 95. The hydraulic unit would still be considered to be part of a piston rod assembly, serving along with nut 48 screwed onto the threaded portion 110 at the end of the piston rod to hold the piston on the rod and also to facilitate removal of the piston from the rod.

While grease has been mentioned as the fluid used in the hydraulic unit, other fluids can be used, preferably a fluid having such temperature coefficient of expansion as to maintain the piston tight on the rod during use despite heating of the parts thereby. In view of the easy access to the zerk fitting 62 by removal of the bonnet 60, the hydraulic unit can be easily repressured whenever desired, the ease of repair of the piston and piston rod making regular service inspections a desirable economical procedure.

While a preferred embodiment of the invention has been shown and described, many modifications thereof can be made by one skilled in the art without departing from the spirit of the invention, and it is desired to protect by Letters Patent all forms of the invention falling within the scope of the following claims.

I claim:

1. In combination, a piston and piston rod assembly comprising a piston rod having a thrust shoulder (45) formed adjacent one end facing toward the other end of the rod, said shoulder flaring in the direction going from said one end toward said other end, a wear sleeve snugly fitted over said rod extending from said shoulder to adjacent said other end of the rod, said wear sleeve having the one end (97) adjacent said shoulder beveled correlative to said shoulder, a hydraulic unit (47) having an axial hole (73, 74) therethrough snugly fitted over said rod adjacent the other end of the wear sleeve, said hydraulic unit including a hydraulic piston (72), said axial hole through said unit extending through the axis of said piston, said hydraulic piston having an end face (95) abutting the said other end of the wear sleeve, means for sealing between said piston rod and said axial hole (74) through the piston portion of the hydraulic unit including an O-ring (80) around said rod and disposed in an annular groove (81) around the periphery of said axial hole, means for limiting the axial travel of said hydraulic piston toward said wear sleeve including a first interlocking portion on said hydraulic piston comprising an annular groove (91) around the periphery of said axial hole and a resilient split ring (90) received in annular groove (91) around the periphery of said axial hole, a second interlocking portion on said rod comprising a square stop shoulder (92) formed on said piston rod adjacent said ring, facing away from said one end of the rod,
said rod having a tapered portion (93) adjacent said stop shoulder,
said split ring having a square side face (98) adjacent said stop shoulder,
said split ring having a tapered inner periphery (99) flaring away from said side face,
the distance between said stop shoulder (92) and said thrust shoulder (45) being slightly less than the unstressed length of said wear sleeve plus that portion of the hylraulic piston from said end face thereof to the side (96) of the second said annular groove which side is farthest from said end face of the piston less the axial extent of said split ring,
said hydraulic unit (47) further including a hydraulic cylinder (70),
said cylinder having a bore 105 snugly receiving the outside of said hydraulic piston,
said cylinder having a closed end (71) through which extends said axial hole through the hydraulic unit,
means to seal between said closed end of the cylinder and said rod,
the last said sealing means including
an O-ring (76) around the rod and received in an annular groove (77) around the periphery of said axial hole through the closed end of the cylinder,
means to seal between said bore of the cylinder and the outside of said hydraulic piston,
the last said sealing means including
an O-ring (78) around the hydraulic piston and received in an annular groove (79) around the periphery of said cylinder bore,
said piston rod having a piston mounting portion (107) adjacent the end of said hydraulic unit that is remote from said wear sleeve,
said piston mounting portion being tapered flaring toward said one end of the piston rod,
the last said tapered portion having a non-seizing taper,
a piston mounted on said piston mounting portion of said rod,
said piston having an axial opening (108) correlative to said piston mounting portion,
means for holding said piston against axial movement toward said other end of the rod,
said holding means including
a threaded portion (110) at said other end of said rod adjacent said piston mounting portion, and
a nut (48) screwed onto said threaded portion against said piston, and
means for pressurizing said hydraulic unit,
said pressurizing means including
said piston rod having an axial passage (100) extending from said other end of said rod to a position within said hydraulic unit,
said piston rod having a radial passage (101) extending from said axial passage to the annular space (102) around said rod between said hydraulic cylinder and hydraulic piston of said hydraulic unit,
a fitting (62) attached to the end of said axial passage at said other end of said rod,
said fitting including a check valve preventing flow from said axial passage out of said rod,
said fitting further including attachment means for connecting a grease pump thereto, and
hydraulic fluid under pressure filling said axial and radial passages and annular space,
said fluid being grease.

2. A piston and piston rod assembly comprising
a piston rod having a thrust shoulder near one end facing toward the other end,
a wear sleeve on said rod having one end abutting said thrust shoulder,
a hydraulic unit on said rod adjacent the other end of said wear sleeve,
a piston mounted on said rod adjacent said hydraulic unit at the opposite side thereof from said wear sleeve,
means on said rod at the opposite side of said piston from said hydraulic unit for holding said piston against axial movement toward said other end of the rod, and
means for pressurizing said hydraulic unit, including passage means formed on said rod communicating at one end with said hydraulic unit and extending therefrom past said piston toward said other end of the rod to the exterior surface of the rod and a check valve in said passage means.

3. A combination of claim 2 wherein said hydraulic unit includes
a hydraulic piston member and
a hydraulic cylinder member,
one of said members bearing against said piston and the other of said members bearing against said wear sleeve,
said assembly including
means for limiting the axial thrust of said other of said members toward said wear sleeve,
the last said means including interengaging means between said rod and said other of said members limiting the travel of said other of said members toward said wear sleeve.

4. A hydraulic unit for use with a piston and piston rod assembly comprising
a hydraulic cylinder having one end closed except for an axial hole therethrough adapted to pass over a piston rod,
means around the periphery of said hole to seal with a piston rod,
said hydraulic cylinder having a bore larger than said axial hole,
a hydraulic piston received in said bore,
said piston having an axial hole therethrough adapted to pass over a piston rod and of equal diameter to said hole through said cylinder,
means around the periphery of said hole in said piston to seal with a piston rod,
means around the bore of said cylinder to seal with the outer periphery of said piston, and
means around the periphery of said hole in said piston closer to said closed end of the cylinder than said sealing means in said axial hole in said piston for interlocking with a correlative interlocking means on a piston rod to limit axial travel of the hydraulic piston in one direction on said piston rod.

References Cited in the file of this patent
UNITED STATES PATENTS

| | | |
|---|---|---|
| Re. 21,114 | Suhm et al. | June 13, 1939 |
| 303,701 | Carricaburu | Aug. 19, 1884 |
| 961,375 | Seabrook | June 14, 1910 |
| 1,883,662 | Fisher | Oct. 18, 1932 |
| 2,164,159 | Millmine | June 27, 1939 |
| 2,825,241 | Ferris | Mar. 4, 1958 |
| 2,840,399 | Harless et al. | June 24, 1958 |
| 2,851,903 | Norris et al. | Sept. 16, 1958 |
| 2,978,167 | Harp | Apr. 4, 1961 |
| 3,033,597 | Miller | May 8, 1962 |